United States Patent [19]

Ufermann

[11] 4,454,940

[45] Jun. 19, 1984

[54] APPARATUS FOR FORMING MATS, ESPECIALLY FOR THE PRODUCTION OF PARTICLEBOARD

[75] Inventor: Werner Ufermann, Brüggen-Haverslohe, Fed. Rep. of Germany

[73] Assignee: G. Siempelkamp GmbH & Co., Krefeld, Fed. Rep. of Germany

[21] Appl. No.: 368,848

[22] Filed: Apr. 15, 1982

[30] Foreign Application Priority Data

Apr. 19, 1981 [DE] Fed. Rep. of Germany ....... 3115728

[51] Int. Cl.$^{3}$ .............................................. B65G 47/24

[52] U.S. Cl. .................................... 198/374; 425/363; 264/113; 198/382

[58] Field of Search ............... 198/382, 532, 569, 396, 198/565, 394, 553, 374; 425/81.1, 82.1, 83.1, 363; 264/24, 108, 113

[56] References Cited

U.S. PATENT DOCUMENTS

| | | | |
|---|---|---|---|
| 3,115,431 | 12/1963 | Stokes et al. | 264/108 X |
| 3,864,066 | 2/1975 | Gerhardt | 425/83.1 X |
| 3,896,536 | 7/1975 | Keller et al. | 198/382 X |
| 4,058,201 | 11/1977 | Etzold | 198/382 |
| 4,063,858 | 12/1977 | Axer et al. | 264/113 X |
| 4,068,991 | 1/1978 | Ufermann et al. | 264/113 X |
| 4,308,227 | 12/1981 | Ufermann | 264/113 |
| 4,315,722 | 2/1982 | Ufermann | 264/113 X |
| 4,387,796 | 6/1983 | Enomac | 198/374 |
| 4,388,055 | 6/1983 | Ufermann | 425/363 X |

FOREIGN PATENT DOCUMENTS 2535461 10/1977 Fed. Rep. of Germany .

*Primary Examiner*—Joseph E. Valenza
*Assistant Examiner*—Dennis J. Williamson
*Attorney, Agent, or Firm*—Karl F. Ross; Herbert Dubno

[57] ABSTRACT

An apparatus for forming a mat of comminuted material for the production of pressed board comprises a conveyor belt forming a transport path and a receiving surface for the mat and a plurality of spreading machines spaced apart along the band for depositing respective layers of comminuted material on the surface to form the mat. Each of the spreading machines has a feeder for feeding the comminuted material to a roller grate for depositing the comminuted material in a respective layer with longitudinal orientation of the comminuted material in the direction of movement of the belt. At least one of the machines is provided with a transverse orienter between the roller grate and the belt for imparting a transverse orientation to the comminuted material deposited on the belt. The orienter is shiftable between a position wherein it is interposed between the roller grate of the belt and a position in which it is offset from the interposed position.

9 Claims, 4 Drawing Figures

APPARATUS FOR FORMING MATS, ESPECIALLY FOR THE PRODUCTION OF PARTICLEBOARD

Cross Reference to Related Applications

The instant application is related to the commonly assigned copending applications Ser. No. 356,298 filed Mar. 10, 1982, Ser. No. 272,473 filed June 11, 1981, Ser. No. 179,700 filed Aug. 1, 1980, and U.S. Pat. Nos. 4,308,227 and 4,315,722 issued Dec. 29, 1981 and Feb. 16, 1982, respectively, on applications which were copending with some of the aforementioned applications.

The aforementioned applications and patents are the result of work by the instant applicant alone or together with others.

Reference may also be had to the literature of record in the file of the above cases.

Field of the Invention

My present invention relates to a mat-forming apparatus and, more particularly, to an apparatus for depositing comminuted materials, i.e. particles, fibers or other noncoherent substances to form a mat which can be pressed in the production of pressed board, i.e. particleboard, fiberboard or the like.

Background of the Invention

In the formation of pressed board, e.g. chipboard, particleboard, fiberboard, a mat or layer of loosely coherent material, i.e. particles such as wood chips, fibers, cellulosic materials and the like, is formed upon a layer-receiving surface, with or without added binder, and pressed, generally with heat, to form the particleboard.

The density of the particleboard depends, of course, upon the materials used, the pressing parameters and the like, and may range from extremely low density porous pressed board of a type which can be used effectively for insulating purposes, to extremely dense particleboard which can be utilized in load-supporting structures.

As is apparent from the aforementioned applications and patents, the production of the mats or layers can make use of an apparatus for scattering the chips, fibers or other scatterable material upon a receiving surface in the production of particleboard.

In general, an apparatus for this purpose can comprise a plurality of layer-depositing or material-spreading machines, spaced apart along a transport path, and a continuous belt or band displaceable along this path for receiving the mat-forming layers.

Each of these spreading machines can comprise a roller grate by means of which the layer-forming material is spread substantially uniformly over a given area of the band.

The number of layers in the pressed board generally is a function of the number of such scattering machines provided along the path or in use along this path and, by the use of a number of such machines which can be selectively operated, it is possible to provide various structures of the spread material and hence modify the structure of the pressed board in various ways.

Utilizing the roller grate system disclosed, for example, in the aforementioned applications and patents, the orientation of the particles tends to be longitudinal, i.e. in the direction of movement of the band. This, of course, limits the versatility of pressed board production since transverse orientations of the particles, fibers or the like is not possible with such arrangements.

Such transversely oriented layers are frequently desired, alternating with or sandwiched between longitudinally oriented layers, to increase the strength of the pressed board in certain directions as compared with others, or to otherwise alter the physical properties of the finished pressed board.

Objects of the Invention

It is the principal object of the present invention to provide an improved mat-forming apparatus for the purposes described whereby the layers can selectively have longitudinal and transverse orientations, the longitudinal orientation being understood to be an orientation in the direction of movement of the conveyor belt upon which the layer is formed.

Another object of this invention is to provide an improved apparatus adapted to form layers or mats to be transformed into pressed board whereby the disadvantages of earlier systems are obviated.

Summary of the Invention

These objects and others which will become apparent hereinafter are obtained, in accordance with the present invention, in a system of the type described, i.e. an arrangement in which a plurality of layer-spreading machines are provided in succession along a transport path formed by a conveyor belt adapted to receive the layers and form mats which can be transformed into pressed board by conventional pressing operations, the invention residing in the provision in at least one of these spreading machines, below the roller grate which deposits the layer upon the conveyor belt, of a transverse orienting means formed as a traveling grate with transverse orientation baffles formed as bars of this grate. According to an important feature of the invention, the transverse orienting device, when the latter is to be inactivated, is mounted so as to be shiftable from a location directly below the roller grate to a location laterally offset therefrom.

Transverse orientation devices which can be used for the puroposes of the present invention are themselves described, for example, in German patent document No. 30 22 629.

Such devices have not, to my knowledge, been used heretofore in combination with other scattering machines or roller grates of the type described previously and, moreover, the transverse orientation means is not shiftable to offset the latter from the path of a roller grate or the like.

With the apparatus of the present invention, the transverse orientation means for the or each machine can be brought into play by simply disposing it between the roller grate and the receiving surface or can be disabled by simply shifting the transverse orientation grate into an offset position.

As a consequence, the layers which are deposited by the various machines upon the receiving surface or belt can have either a transverse orientation or the longitudinal orientation which results from disabling of the transverse orientation device.

Practically any selective orientation of the fibers of the mat or layer can be generated.

For example, it is possible to provide an upper layer, a lower layer and an intermediate layer using three such machines arranged along the path of the conveyor belt and to make the upper and lower layers either longitudinally oriented or transversely oriented layers while the intermediate layer is of the other type, i.e. transversely oriented when the upper and lower layers are longitudinally oriented.

The invention is not, however, limited to three layers and any number of layers can be generated utilizing a corresponding number or spreading machines in succession along the path and, for example, providing transverse orienters for alternating machines so that the alternate layers will be longitudinal and transversely oriented.

It is possible to provide, in accordance with the present invention, a socalled "duo", i.e. dual layer scattering or spreading machine in which a feeder delivers the material to be deposited simultaneously to a pair of roller grates, each of which deposits a respective layer upon the moving surface of the belt. According to the invention, one or both of these roller grates can be provided with a transverse orienter or such transverse orienters can be provided for each of the roller grates and both of them can be offset to disable the transverse orientation mode as may be required.

Such a duo can be preceded or succeded by a other spreading machines for applying additional layers to the mat.

It has been found to be advantageous, especially for production of mats of large thickness so that the resulting pressed board will also be of considerable thickness, to provide means for enabling the adjustment of the displacement of the roller grate and/or the transverse orienter from the belt.

Since the transverse orienter and the roller grate are generally disposed above the receiving belt, such means can be means for adjusting the height of the roller grate and the transverse orienter.

When a transverse grate is disabled or shifted out of the path of the scattered material from a roller grate, the height of the latter can be adjusted so that the thickness of the layer which is deposited is significant and any orientation is obscured. The orientation generated by the roller grate can be practically eliminated when, in the absence of the transverse orienter, a considerable free fall is permitted between the roller grate and the particle-receiving surface.

Either the roller grate or the transverse orienter or both can be arranged so as to be inclined to the receiving belt, the inclination being preferably adjustable and having the effect of ensuring some orientation, if only because of the close proximity of the lowest portion of the inclined device to the belt.

The roller grate can be of any of the constructions described in the aforementioned copending applications and patents and can, for example, utilize pin wheels, drums with pins, spikes or pegs projecting therefrom, interdigitated rows of disks which can be provided with chamber walls extending in the radial direction so that they also form chamber rows.

In a preferred embodiment of the invention, in which the longitudinal orientation is effected simultaneously with a classification of the material to be spread utilizing the length of the fibers as the significant dimension, a multiplicity of interdigitating spreading disks form the roller grate. This roller grate has the advantage that it can spread large volumes of material relatively uniformly in the gaps between the rollers and between the rollers and the shafts of disks interdigitating with one another. Within the gaps between the rollers, swingable partitions, which also can be vertically shiftable, can be provided.

Brief Description of the Drawing

The above and other objects, features and advantages of the present invention will become more readily apparent from the following description, reference being made to the accompanying drawing in which.

Specific Description

Figure 1:
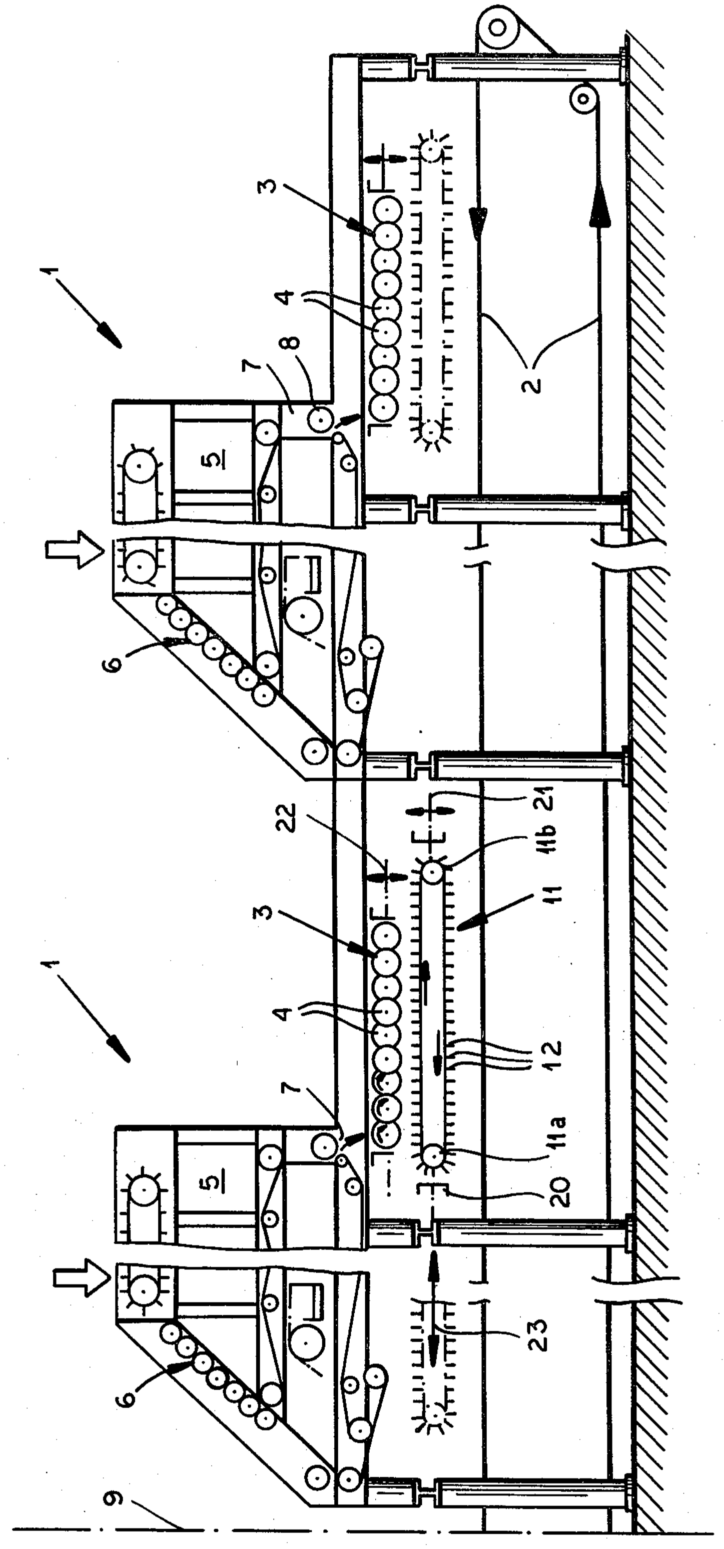
FIG. 1 is a side-elevational view, in highly diagrammatic form, of an apparatus embodying the present invention.

The apparatus shown in the drawing is utilized to spread wood chips, sawdust, fibers or other comminuted material in the formation of a layer or mat which can be transformed, e.g. by hotpressing, into particleboard, fiberboard, chipboard or another coherent structural material, hereinafter referred to broadly as pressed board.

Basically the apparatus comprises a number of spreading machines 1, disposed in succession along a horizontal conveyor belt 2 forming a transport for the layers or mats. The belt 2 passes beneath all of the spreading machines 1 and is continuously operated during the spreading process.

Figure 2:
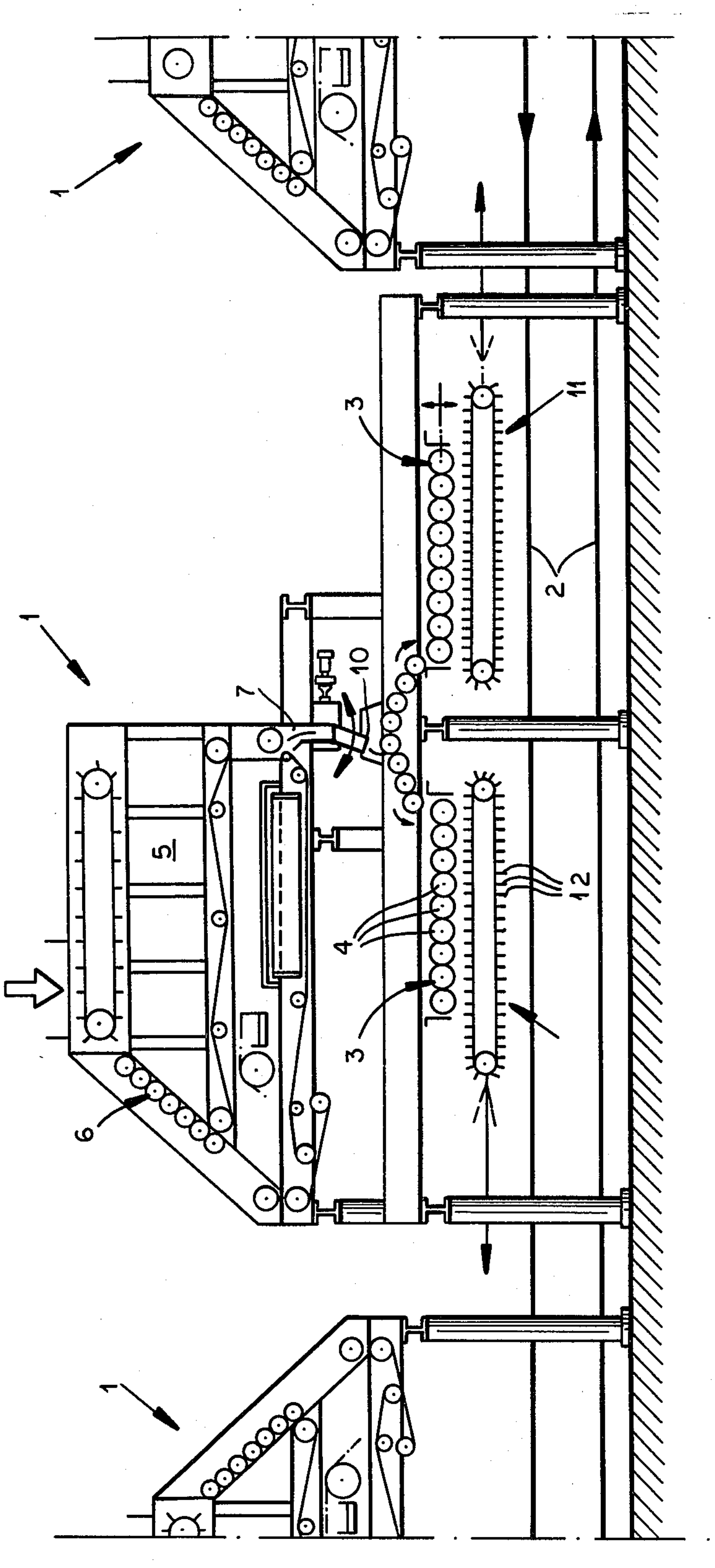
FIG. 2 is a similar view illustrating another embodiment of the invention.

Each of the spreading machines 1 is provided with a roller grate 3 which consists of a multiplicity of spreading rollers 4 in the form of disks which can be interdigitated as shown in FIGS. 1 and 2 and as described in the aforementioned copending applications.

Each spreading machine 1 in addition includes a hopper 5 containing the comminuted material adapted to form the mat and a feeder 6 which can transfer the comminuted material from the hopper, with or without classification, to a shaft 7 through wich the material passes in free fall to a discharge device 8 at which the material is deposited upon the roller grate 4.

In the embodiment of FIG. 1, a symmetry plane 9 is provided which is disposed between two pairs of machines 1, the machines on the left-hand side of the plane being disposed mirror symmetrically to those shown on the right-hand side.

In the embodiment of FIG. 2, however, each machine 1, or at least one of these machines, is provided with a pair of roller grates 3 in mirror symmetrical relationship.

A swingable discharge chute 7 serves to deliver the comminuted material alternately to one side and the other of this symmetry plane and hence to one or the other of the roller grates 3.

In accordance with the invention, at least one and preferably all of the spreading machines 1 is provided, beneath the spreading roller grate 3, with a transverse orienting unit 11.

The transverse orienter 11 is a continuously driven traveling grate which comprises a pair of belts separated by bars or baffles 12 adapted to ensure, because of the close spacing between these bars, a substantially transverse orientation of the fibers passing downwardly between these bars. The traveling grate passes over a pair of rollers 11*a*, 11*b* and can be driven by an electric motor or the like not shown.

The transverse direction, of course, is perpendicular to the plane of the paper in FIG. 1 and, of course, across the belt 2.

In order to render the transverse orienter 11 inoperative, the latter can be shifted out of alignment with the roller grate 3, i.e. to the left as represented by the arrow 23 in FIG. 1, along with the support 20 which can be guided on rollers for this purpose. The rollers can be shifted along a track not shown in FIGS. 1 and 2.

As is also apparent from the FIG. 1, the support 20 can be raised or lowered as represented by the arrow 21 to adjust the height of the transverse orienter.

When the transverse orienter is shifted out of position, i.e. out of alignment with the roller grate 3, only a longitudinal orientation is imparted to the fibers.

When the transverse orienter is in position directly below the roller grate 3, the descending particles are given a transverse orientation.

The roller grate likewise can be vertically adjusted as represented by the arrows 22.

Figure 4:
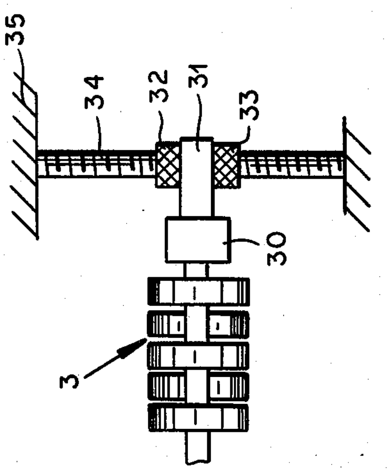

As can be seen from FIG. 4, the disks of the roller grate, only some of which have been shown in FIG. 4, can be carried upon lateral supports 30 which are mounted upon respective plates 31 to either side of the roller grate, the disks of which can be driven as described in the aforementioned copending applications. The plates 31 can be mounted between nuts 32 and 33 which can be adjusted along a screw 34 on the machine frame 35 to allow vertical adjustment of the roller grate 3.

Figure 3:
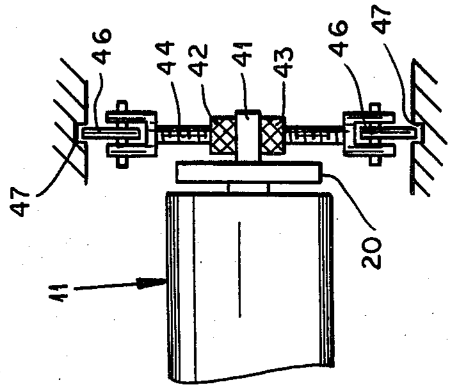
FIGS. 3 and 4 are detail views showing means for vertically adjusting various elements of the devices of FIG. 1 and FIG. 2.

As can be seen from FIG. 3, a similar threaded rod 44 can be provided to adjustably support the framework 20 of the traveling grate 11, the framework 20 having a plate 41 received between the nuts 42 and 43 threaded onto the rod 44.

Thus by loosening one of the nuts and tightening the other, the height of the traveling grate is adjusted.

The rods 44, of which only one is shown in FIG. 3, carry rollers 46 which ride in tracks 47 of the machine frame to enable the traveling grate to be shifted out of alignment with the roller grate to render the transverse orienter ineffective.

I claim:

1. An apparatus for forming a mat of comminuted material for the production of pressed board, comprising:

a conveyor belt forming a transport path and a receiving surface for said mat; and a plurality of spreading machines spaced apart along said band for depositing respective layers of comminuted material on said surface to form said mat, each of said spreading machines comprising:

means for receiving said comminuted material, a feeder connected to said receiving means for displacing said comminuted material, and a roller grate oriented above said surface and receiving said comminuted material from said feeder for depositing said comminuted material in a respective layer with longitudinal orientation of the comminuted material in the direction of movement of said belt, at least one of said machines being provided with a transverse orienter between said roller grate and said belt for imparting a transverse orientation to the comminuted material deposited on said belt, and means for shifting said transverse orienter between a position wherein said transverse orienter is interposed between the roller grate of said one of said machines and said belt and a position in which said transverse orienter is offset from the interposed position.

2. The apparatus defined in claim 1 wherein said transverse orienter is a traveling grate in the form of a belt having transverse bars forming baffles.

3. The apparatus defined in claim 2 wherein said one of said machines has a pair of roller grates, each of which is provided with a respective one of said traveling grates forming a respective transverse orienter, said transverse orienters being selectively shiftable out of alignment with the respective roller grate.

4. The apparatus defined in claim 2, further comprising means for adjusting the height of the roller grate of said one of said machines.

5. The apparatus defined in claim 2, further comprising means for adjusting the height of the traveling grate of said one of said machines.

6. The apparatus defined in claim 2 wherein said roller grate of said one of said machines is inclined to said belt.

7. The apparatus defined in claim 2 wherein said traveling grate is inclined to said belt.

8. The apparatus defined in claim 2 wherein said roller grate comprises a multiplicity of interdigitating disk-shaped rollers.

9. The apparatus defined in claim 8 wherein said roller grate comprises a plurality of rollers having gaps between them, further comprising baffles in said gaps.

* * * * *